United States Patent
Gregg et al.

(10) Patent No.: US 9,403,239 B2
(45) Date of Patent: Aug. 2, 2016

(54) SYSTEMS FOR MANUFACTURING ELONGATE WELDMENTS

(71) Applicant: The Boeing Company, Seal Beach, CA (US)

(72) Inventors: Paul Stevenson Gregg, Normandy Park, WA (US); Kirk B. Kajita, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 13/952,908

(22) Filed: Jul. 29, 2013

(65) Prior Publication Data

US 2015/0030381 A1    Jan. 29, 2015

(51) Int. Cl.

| | | |
|---|---|---|
| *B23K 31/00* | (2006.01) | |
| *B23K 31/02* | (2006.01) | |
| *B32B 38/00* | (2006.01) | |
| *C21D 7/02* | (2006.01) | |
| *C22F 1/18* | (2006.01) | |
| *B21D 3/16* | (2006.01) | |
| *C21D 9/50* | (2006.01) | |
| *C22F 1/00* | (2006.01) | |

(52) U.S. Cl.
CPC . *B23K 31/02* (2013.01); *B21D 3/16* (2013.01); *B32B 38/0012* (2013.01); *C21D 7/02* (2013.01); *C22F 1/183* (2013.01); *B23K 2201/16* (2013.01); *C21D 9/50* (2013.01); *C22F 1/00* (2013.01); *Y10T 403/477* (2015.01)

(58) Field of Classification Search
CPC .............. B23K 31/02; B23K 2201/16; B23K 2201/28; B21D 3/16; C22F 1/183; C22F 1/00; C21D 7/02; C21D 9/50; B32B 38/0012; Y10T 403/477

See application file for complete search history.

(56) References Cited

U.S. PATENT DOCUMENTS

| | | | |
|---|---|---|---|
| 7,810,757 B2 | 10/2010 | Kirkwood et al. | |
| 2004/0031307 A1* | 2/2004 | Elmaleh | B21B 37/24 72/240 |
| 2012/0280192 A1* | 11/2012 | Olsson | B21H 7/00 256/1 |

OTHER PUBLICATIONS

Asm Handbook, vol. 6, Welding, Brazing, and Soldering, Dec. 1993, ASM International, U.S.A, XP002729535, ISBN: 0-87170-377-7, vol. 6, pp. 1099-1100, p. 1100, col. 3, paragraph 3—paragraph 4; figure 11.

* cited by examiner

*Primary Examiner* — Moshe Wilensky
(74) *Attorney, Agent, or Firm* — DASCENZO Intellectual Property Law, P.C.

(57) ABSTRACT

Methods of manufacture include welding two or more elongate members together to define an elongate weldment, wherein the welding results in a weld region that is in tension and regions adjacent to the weld region that are in compression, and longitudinally stretching the elongate weldment. Tools and systems for manufacturing elongate weldments, as well as apparatuses, such as aircraft, that include elongate weldments, also are disclosed.

20 Claims, 7 Drawing Sheets

Fig. 22

SYSTEMS FOR MANUFACTURING ELONGATE WELDMENTS

FIELD

The present disclosure relates to elongate weldments.

BACKGROUND

Elongate metal structures, generally with constant cross-sectional profiles along their lengths, may be used in a variety of applications for a variety of reasons. Commonly, such structures are formed using an extrusion process. For example, aluminum extrusions are commonly used in many applications, including as brackets, tracks, frames, rails, mullions, heat sinks, etc. In aerospace applications, extrusions may be used for seat tracks, ribs, spars, joints between various panels, etc. In various aerospace applications, titanium is a preferred material. However, extruding titanium results in scaling, which may prevent a part from being used in certain applications and is costly and time-consuming to remove.

SUMMARY

Methods, tools, and systems for manufacturing elongate weldments, as well as various apparatuses, such as aircraft, that include elongate weldments, are disclosed herein.

Some methods include welding two or more elongate members together to define an elongate weldment. The welding may result in a weld region that is in tension and regions adjacent to the weld region that are in compression. Such methods further may include longitudinally stretching the elongate weldment.

Some tools for manufacturing elongate weldments include two spaced-apart grippers, with each gripper being configured to selectively and securely grip an end region of an elongate weldment. Such tools also may include a mechanism configured to selectively move the two spaced-apart grippers away from each other to selectively stretch an elongate weldment that is held by and between the two spaced-apart grippers.

Some systems for manufacturing elongate weldments include a stock of two or more ribbons of material, a welder positioned to operatively weld together the two or more ribbons to define an elongate weldment, a stretcher positioned and configured to stretch the elongate weldment, and a cutter positioned and configured to cut the elongate weldment into a plurality of elongate weldments after the elongate weldment has been stretched by the stretcher.

DESCRIPTION

Figure 1:
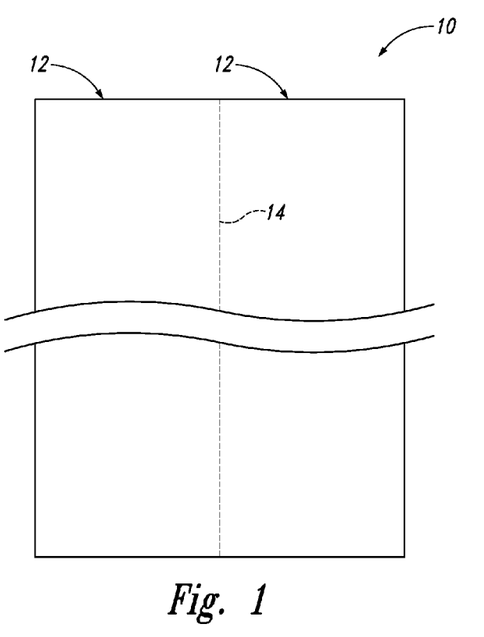
FIG. 1 is a schematic diagram representing elongate weldments.
Figure 2:
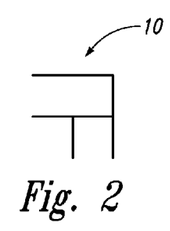
FIG. 2 is a schematic profile view of an illustrative, non-exclusive example of an elongate weldment.

Elongate weldments, apparatuses that include elongate weldments, and methods of manufacturing elongate weldments are disclosed herein. In FIG. 1, an elongate weldment 10 is schematically presented. As used herein, an elongate weldment refers to an assembly of two or more elongate members 12 that are welded together along a joint, or interface, 14 of the two members. By elongate, it is meant that a respective elongate weldment or elongate member has a length that is longer than, and in some embodiments is substantially longer than, its width. Elongate members typically are constructed of sheet material, for example, having a length and a width that are substantially greater than a thickness. In some examples, elongate members may be constructed of generally planar sheet material. Additionally or alternatively, elongate members may be constructed of sheet material that is not planar. Illustrative, non-exclusive examples of materials from which elongate members 12, and thus elongate weldments 10, may be constructed include (but are not limited to) metals, such as titanium, titanium alloys, aluminum, aluminum alloys, and steels, as well as weldable plastics and other materials.

Any suitable number of elongate members may be welded together to define an elongate weldment. FIGS. 2-11 illustrate in profile ten illustrative, non-exclusive examples of elongate weldments that may be constructed according to the present disclosure. The example of FIG. 2 may be constructed from four elongate members welded together, for example, to define an elongate weldment suitable for joining two panels at a right angle relative to each other. Alternatively, the example of FIG. 2 may be constructed of three elongate members, with two of the members defining right angle bends, and with a third elongate member being welded between the two elongate members. The example of FIG. 3 may be constructed from two elongate members, and thus may require only a single weld to join the two elongate members. FIGS. 4-11 illustrate further examples of possible profiles of elongate weldments.

Figure 12:
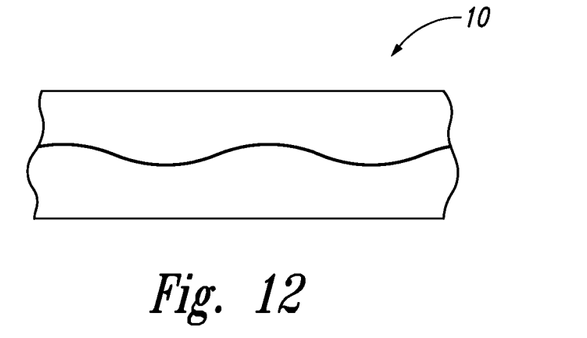
FIG. 12 is a fragmentary side view of another illustrative, non-exclusive example of an elongate weldment.

FIG. 12 illustrates in a side view an illustrative, non-exclusive example of an elongate weldment defined by two elongate members, with one of the elongate members having a sinusoidal curvature to it. Accordingly, the associated weld that joins the two elongate members together also has a sinusoidal curvature to it. In contrast, the welds of the examples of FIGS. 2-11 may all be linear along the full length of the respective elongate weldments, such as if the elongate members 12 from which an elongate weldment 10 is constructed are generally planar.

Figure 3:
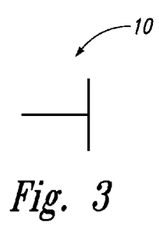
FIG. 3 is a schematic profile view of another illustrative, non-exclusive example of an elongate weldment.
Figure 4:
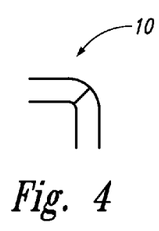
FIG. 4 is a schematic profile view of another illustrative, non-exclusive example of an elongate weldment.
Figure 5:
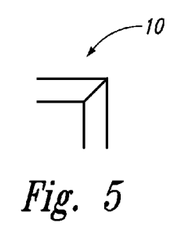
FIG. 5 is a schematic profile view of another illustrative, non-exclusive example of an elongate weldment.
Figure 6:
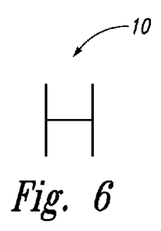
FIG. 6 is a schematic profile view of another illustrative, non-exclusive example of an elongate weldment.
Figure 7:
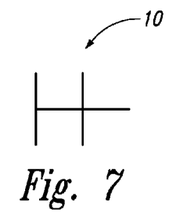
FIG. 7 is a schematic profile view of another illustrative, non-exclusive example of an elongate weldment.
Figure 8:
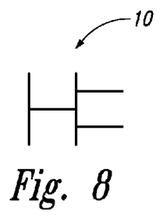
FIG. 8 is a schematic profile view of another illustrative, non-exclusive example of an elongate weldment.
Figure 13:
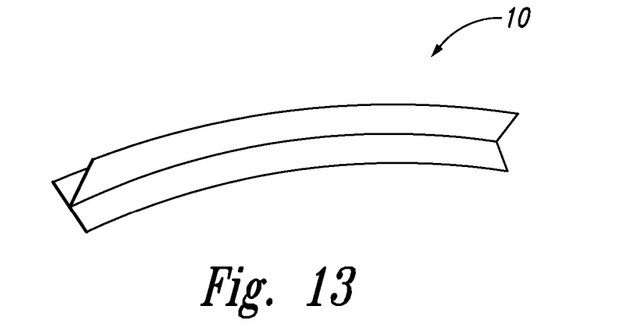
FIG. 13 is a perspective view of another illustrative, non-exclusive example of an elongate weldment.

However, as illustrated in FIG. 13, which illustrates another illustrative, non-exclusive example of an elongate weldment 10 having a cross-sectional profile corresponding to FIG. 3, it also is within the scope of the present disclosure that an elongate weldment 10 may be curved, or otherwise not linear, along its length. In the example of FIG. 13, the elongate weldment may be described as being curved or arcuate along its length, but other examples also are within the scope of the present disclosure, including (but not limited to) elongate weldments that are generally sinusoidal along their length, elongate weldments that are irregular along their length, elongate weldments that otherwise have a desired shape corresponding to a particular application for which it is to be used, etc. The examples of FIGS. 2-13 are provided as illustrative, non-exclusive examples, and the present disclosure is not limited to elongate weldments having the illustrated shapes and configurations.

Figure 14:
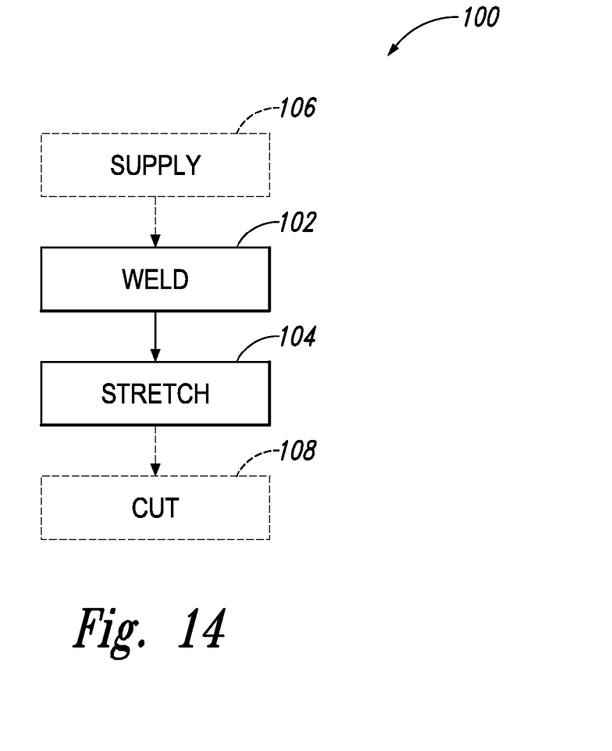
FIG. 14 is a flowchart representing methods of manufacturing elongate weldments.

FIG. 14 schematically provides a flowchart that represents illustrative, non-exclusive examples of methods 100 of manufacturing elongate weldments 10. In FIG. 14, some steps are illustrated in dashed boxes, schematically indicating that such steps may be optional or may correspond to an optional version of a method 100. That said, not all methods according to the present disclosure are required to include the steps illustrated in solid boxes. The methods and steps illustrated in FIG. 14 are not limiting and other methods and steps are within the scope of the present disclosure, including methods having greater than or fewer than the number of steps illustrated, as understood from the discussions herein.

Figure 15:
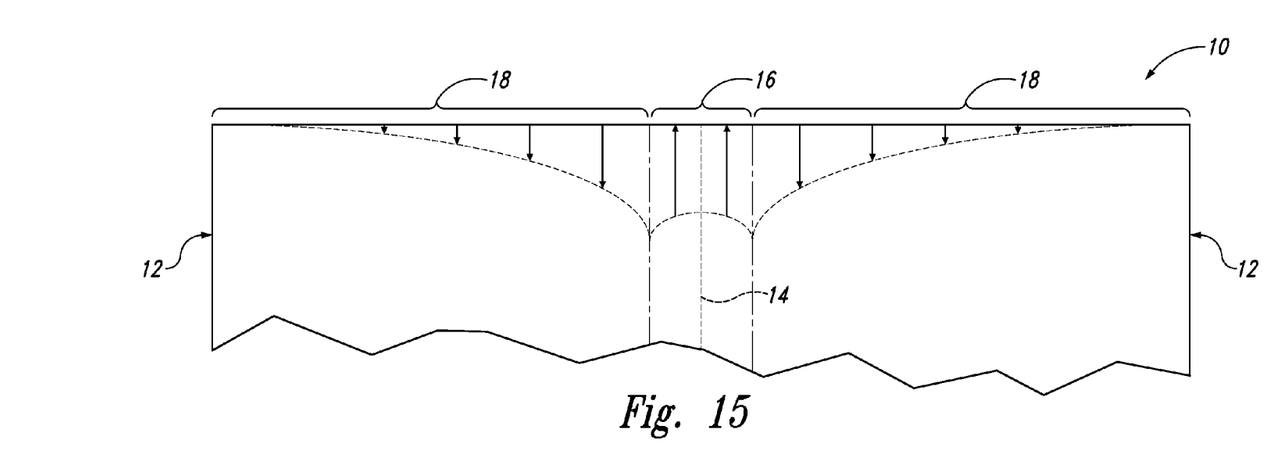
FIG. 15 is a schematic diagram representing elongate weldments and corresponding stress forces following a welding step of a method according to the present disclosure.

As schematically indicated in FIG. 14, a method 100 may include welding 102 two or more elongate members 12 together to define an elongate weldment 10, and then longitudinally stretching 104 the elongate weldment. As schematically illustrated in FIG. 15 with a dash-dot boundary on both sides of the interface 14 between the two elongate members 12, the welding 102 results in a weld region 16 that spans at least a portion of the elongate weldment along the interface 14 between the two welded together elongate members. The weld region of an elongate weldment also may be described as the heat-affected zone because within the weld region, the material properties may be altered, and in some embodiments substantially altered, during the welding process. For example, during a welding process, the material being welded becomes molten, and when the molten material subsequently cools, which may occur very rapidly depending on the specific welding process being used and on the environment of the welding operation, the weld region may tend to shrink in the longitudinal direction of the elongate weldment. As a result, the weld region 16 is placed in tension, and regions 18 that are adjacent to the weld region are placed in compression. These internal tensile and compressive stress forces are schematically illustrated in FIG. 15 with the vertical arrows in reference to the curved lines schematically representing relative magnitudes of the tensile and compressive stress forces. As schematically illustrated, the stress forces may tend to be greatest at the transition from the weld region 16 to the regions 18 that are adjacent to the weld region. In some examples, the tensile and compressive stress forces may be significant, including as great as, or nearly as great as, the yield strength prior to the welding of the material from which the elongate members are constructed.

Figure 16:
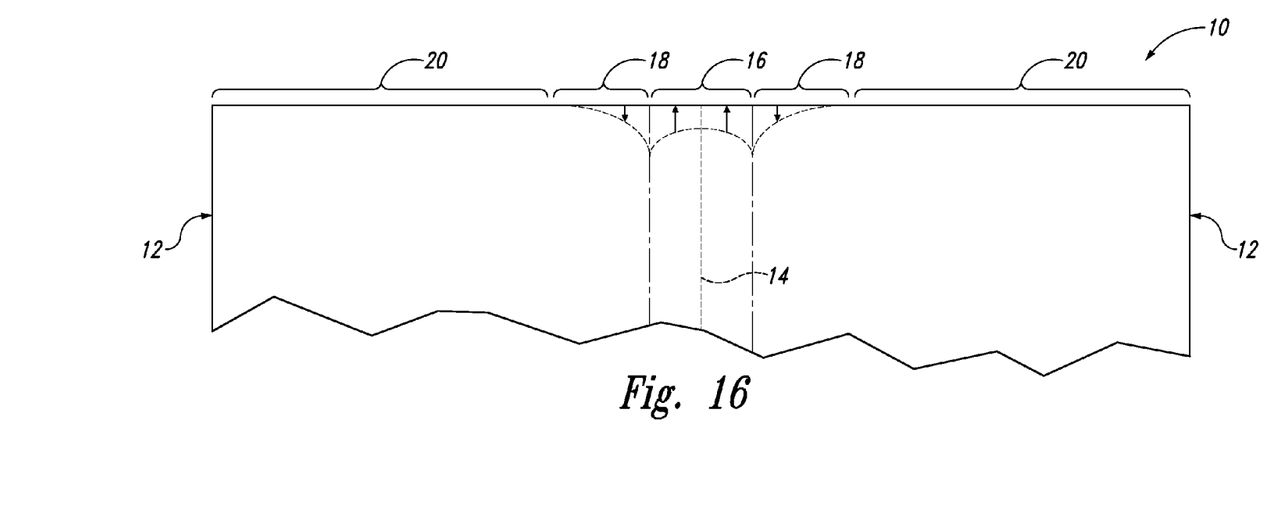
FIG. 16 is another schematic diagram representing elongate weldments and corresponding stress forces following a welding step of a method according to the present disclosure.

In some methods 100, the welding 102 may result in a region 18 of compression that spans the entirety of an elongate member 12 outside of the weld region 16, such as schematically illustrated in FIG. 15. In other methods, such as schematically illustrated in FIG. 16, the welding 102 may result in a region 18 of compression that does not span the entirety of an elongate member 12 outside of the weld region, and thus resulting in a region 20 that is distal from the weld region 16 relative to the region 18 and that is neither in compression nor in tension as a result of the welding. Illustrative, non-exclusive factors that may affect the size and span of regions 18 and regions 20 of an elongate weldment include (but are not limited to) the material of the elongate members being welded, the type of welding utilized, the temperature of the welding, the ambient environment associated with the welding, the duration of the welding, etc.

As a result of the internal tensile and compressive stress forces that result from the welding 102, an elongate weldment 10 may tend to twist, buckle, and/or bow, any one of which may be an undesirable characteristic of a manufactured elongate weldment. To restrict, prevent, or counteract these undesirable characteristics, in some methods 100, the longitudinally stretching 104 may include plastically deforming the weld region 16. Stated differently, the longitudinally stretching 104 may include applying an applied tension to the elongate weldment 10 that is greater than the plastic yield strength of the weld region 16. As a result of the plastic deformation of the weld region, the elongate weldment may be, or substantially may be, neither in compression nor in tension after the longitudinally stretching 104.

In some methods 100, the longitudinally stretching 104 also may include elastically deforming the regions 18 that are adjacent to the weld region 16. In some such methods, the regions 18 may only be elastically deformed and may not be plastically deformed. Additionally or alternatively, at least a substantial portion of the regions 18 may only be elastically deformed and may not be plastically deformed. That is, the longitudinally stretching 104 may include applying an applied tension to the elongate weldment that is less than the plastic yield strength of the regions 18. Additionally or alternatively, the applied tension may be less than the plastic yield strength of the elongate members 12 prior to the welding 102.

In methods 100 in which the welding 102 results in regions 20 that are distal from the weld region 16 relative to the regions 18 and that are neither in compression nor in tension, the longitudinally stretching 104 may include elastically deforming the regions 20. Additionally or alternatively, the longitudinally stretching 104 may only elastically deform the regions 20, such that the regions 20 are not plastically deformed during the stretching process. That is, the applied tension during the longitudinally stretching 104 may be less than the plastic yield strength of the regions 20.

In some methods 100, at least a portion of the regions 18 adjacent to the weld region 16 may be plastically deformed during the longitudinally stretching 104. In other words, the applied tension during the longitudinally stretching 104 may be greater than the plastic yield strength of the regions 18.

The longitudinally stretching 104 may result in the elongate weldment 10 being, or at least substantially being, neither in compression nor in tension. Additionally or alternatively, the longitudinally stretching 104 may result in the elongate weldment 10 having, or at least substantially having, a uniform yield strength across an entirety, or at least substantially an entirety, of the elongate weldment. In some methods 100, the resulting yield strength, which may be generally uniform, may be equal to, or at least substantially equal to, the yield strength of the elongate members 12 from which the elongate weldment 10 was formed prior to the welding 102 and the longitudinally stretching 104. Accordingly, the material properties of the elongate weldment 10 manufactured according to a method 100 may be the same as, or at least substantially the same as, the selected material from which the elongate weldment was constructed.

Moreover, following the longitudinally stretching 104, the elongate weldment 10 may not twist, buckle, or bow into an undesirable shape, and instead may remain in a desired shape. In some applications, the elongate weldment may be linear or generally linear along its entire length. However, as discussed with reference to the example of FIG. 13, it also is within the scope of the present disclosure that an elongate weldment 10 may be curved or otherwise non-linear along its length. Accordingly, the longitudinal stretching 104 of an elongate weldment may be performed with the elongate weldment in engagement with a mandrel or other form having a surface contour to which the elongate weldment conforms, or otherwise engages, during the longitudinally stretching 104. As used herein, longitudinally stretching does not require a linear weld or interface 14. For example, with reference to the illustrative, non-exclusive elongate weldments 10 of FIGS. 12 and 13, the corresponding weld regions 16 may be sinusoidal or curved, respectively.

In some methods 100, two or more discrete lengths of elongate members 12 may be welded together and then longitudinally stretched. In such methods, the longitudinally stretching 104 therefore may include engaging end regions of the elongate weldment and pulling on the end regions in opposing directions.

Figure 17:
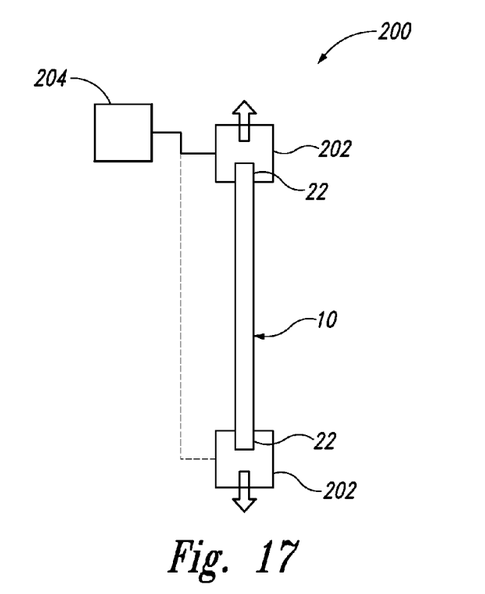
FIG. 17 is a schematic diagram representing illustrative, non-exclusive examples of tools for stretching elongate weldments, illustrated together with a schematic representation of an elongate weldment.

FIG. 17 schematically illustrates an illustrative, non-exclusive example of a tool 200 that may be used to perform such a longitudinally stretching step 104 associated with an elongate weldment that is welded from two or more discrete lengths of elongate members 12. As schematically illustrated, tool 200 includes two spaced-apart grippers 202 that are each configured to selectively and securely grip an end region 22 of an elongate weldment 10. That is, each spaced-apart gripper may be specifically configured to selectively and securely grip an elongate weldment having a specific cross-sectional profile, such as (but not limited to) corresponding to the illustrative, non-exclusive examples of FIGS. 2-13. Stated differently, each gripper may be configured to selectively and securely grip an end region of an elongate weldment that is defined by two or more flat sections that are angled relative to each other. By securely grip, it is meant that the grippers are configured to operatively retain the end regions during the longitudinally stretching step 104 of the corresponding method 100.

Tool 200 also includes a mechanism 204 that is configured to selectively move the two spaced-apart grippers 202 away from each other to selectively stretch the elongate weldment 10 that is held by and between the two spaced-apart grippers. In some tools 200, one of the grippers 202 may be grounded, and the mechanism 204 may be configured to operatively move the other of the two grippers. In some tools 200, the mechanism 204 may be configured to selectively and operatively move both of the two grippers away from each other, such as schematically illustrated in FIG. 17 with the mechanism being optionally coupled to both grippers 202. As an illustrative, non-exclusive example, the mechanism 204 may be a hydraulically operated mechanism.

As optionally and schematically illustrated in FIG. 14, some methods 100 may include supplying 106 stock to define the two or more elongate members that are welded together during the welding 102, and cutting 108 the elongate weldment 10 to define a plurality of elongate weldments 10 after the welding 102 and the stretching 104. Accordingly, such a method 100 may be described as continuously manufacturing a plurality of elongate weldments 10.

In some such continuous manufacturing methods 100, the longitudinally stretching 104 may include longitudinally feeding the elongate weldment at different rates at two spaced-apart positions along the elongate weldment 10. Additionally or alternatively, the longitudinally stretching 104 may include longitudinally pulling at two different pressures at two spaced-apart positions along the elongate weldment 10.

Figure 18:
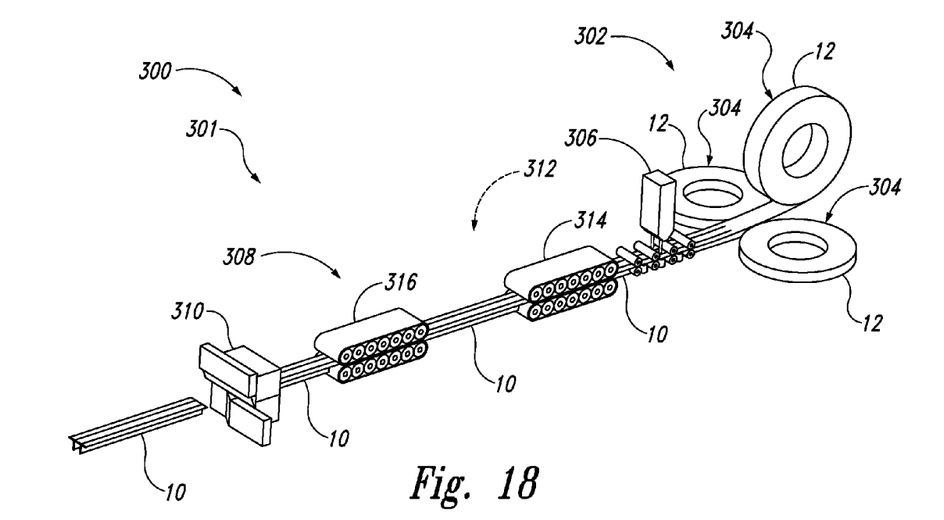
FIG. 18 is a schematic perspective view representing illustrative, non-exclusive examples of systems for manufacturing elongate weldments.
Figure 19:
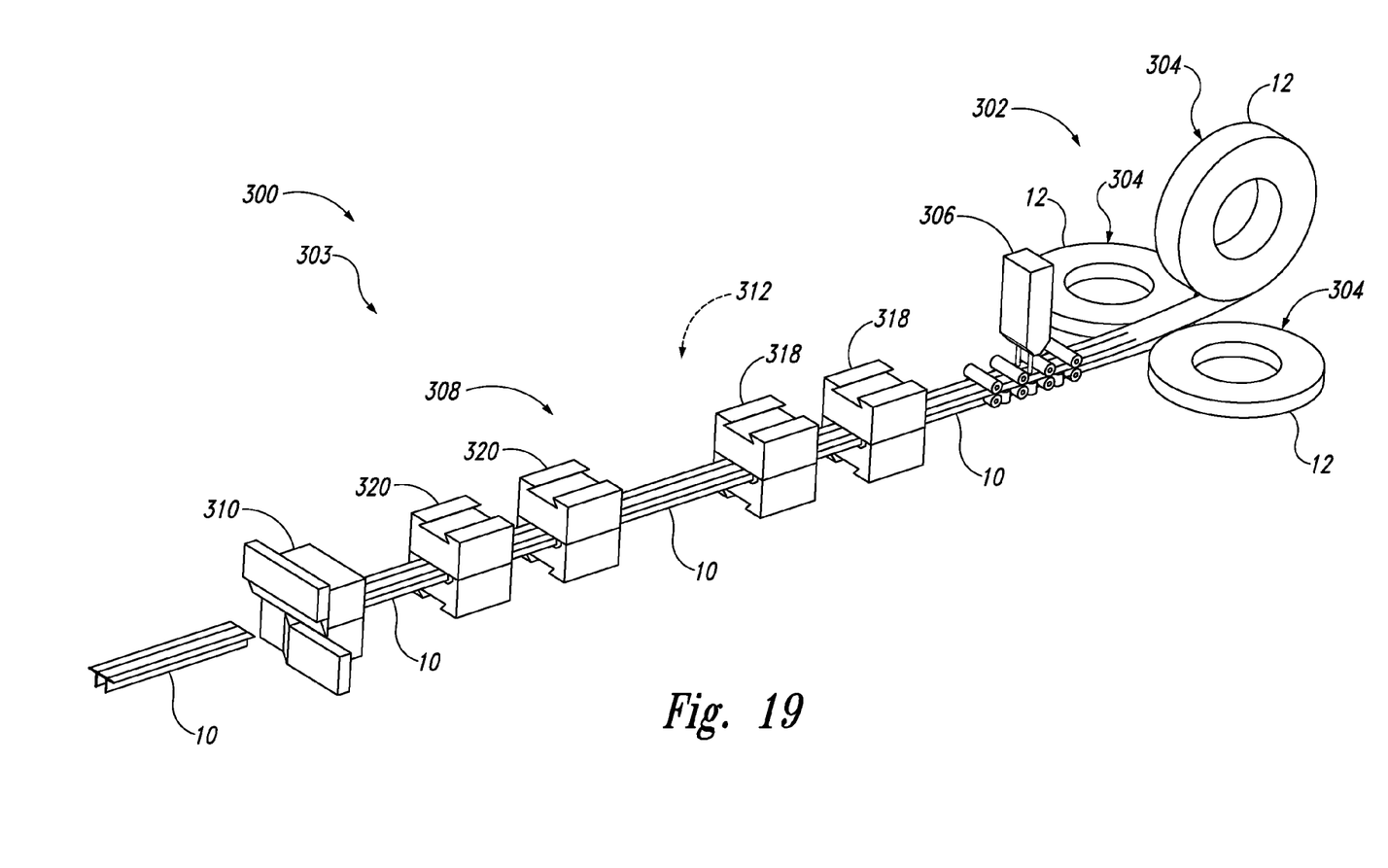
FIG. 19 is a schematic perspective view representing additional illustrative, non-exclusive examples of systems for manufacturing elongate weldments.

FIGS. 18-19 schematically illustrate illustrative, non-exclusive examples of systems 300 that may be used to perform such a continuous manufacturing method 100. A first system 301 is illustrated in FIG. 18, and a second system 303 is illustrated in FIG. 19.

As schematically illustrated, systems 300 include a stock 302 of two or more ribbons 304 of material, a welder 306 positioned to operatively weld together the two or more ribbons to define an elongate weldment 10, a stretcher 308, and a cutter 310 positioned and configured to cut the elongate weldment 10 into a plurality of elongate weldments 10.

Figure 9:
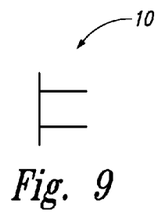
FIG. 9 is a schematic profile view of another illustrative, non-exclusive example of an elongate weldment.
Figure 10:
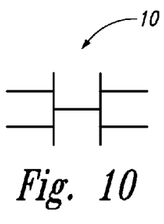
FIG. 10 is a schematic profile view of another illustrative, non-exclusive example of an elongate weldment.
Figure 11:
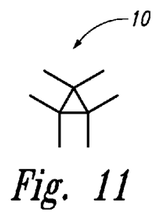
FIG. 11 is a profile view of another illustrative, non-exclusive example of an elongate weldment.

Each ribbon 304 defines an elongate member 12, and in the illustrated example, three ribbons are provided to construct a Pi-shaped elongate weldment 10, such as corresponding to FIG. 9; however, any suitable number of ribbons may be provided to manufacture a desired shape of an elongate weldment 10. Moreover, while the ribbons 304 are illustrated in FIG. 18 in rolls, such a configuration of stock 302 is not required, and planar, or sheet, stock also may be used in a continuous manufacturing method 100 according to the present disclosure.

In the illustrated example, a laser welder 306 is depicted; however, any suitable configuration of welder may be utilized in a continuous manufacturing method 100. Illustrative, non-exclusive examples of other types of welders 306 include (but are not limited to) arc welders, resistance welders, electron beam welders, and ultrasonic welders.

A system 300 additionally may include a feed mechanism 312 that is configured to operatively feed the two or more ribbons 304 from the stock 302, to the welder 306, to the stretcher 308, and ultimately to the cutter 310. In some systems 300, the feed mechanism may include and/or define the stretcher 308. Additionally or alternatively, the stretcher may include and/or define the feed mechanism.

In the illustrated example of system 301 in FIG. 18, the stretcher 308 includes an upstream conveyor 314 and a downstream conveyor 316 that is spaced-apart from the upstream conveyor. The upstream conveyor and the downstream conveyor are configured to operatively grip the elongate weldment 10 and pull the elongate weldment away from the welder 306. In some systems 300, the downstream conveyor is configured to operatively pull on, or feed, the elongate weldment at a faster rate than the upstream conveyor so that a region of the elongate weldment that is between the two conveyors is operatively stretched as it passes between the two conveyors. In other words, the two conveyors are configured to operatively perform the longitudinally stretching 104 of a method 100.

Additionally or alternatively, the downstream conveyor 316 may be configured to pull on the elongate weldment 10 with a higher force, or pressure, than the upstream conveyor 314 so that a region of the elongate weldment between the two conveyors is operatively stretched as it passes between the two conveyors. In some embodiments, the conveyors may be described as, or as including, continuous caterpillar traction belts.

In the illustrated example of system 303 in FIG. 19, the stretcher 308 includes a pair of upstream grippers 318 and a pair of downstream grippers 320 that are spaced-apart from the upstream grippers. The downstream grippers are configured to alternately grip the elongate weldment 10 and pull the elongate weldment away from the welder 306. Similarly, the upstream grippers are configured to alternately grip the elongate weldment and pull the elongate weldment away from the welder, such that at all times during operation, one of each pair of grippers is actively gripping the elongate weldment. The downstream grippers are configured to pull on the elongate weldment at a faster rate and/or with a higher force, or pressure, than the upstream grippers, so that a region of the elongate weldment that is between the downstream grippers and the upstream grippers is operatively stretched as it passes between the two pairs of grippers. In other words, the two pairs of grippers are configured to operatively perform the longitudinally stretching 104 of a method 100.

Figure 20:
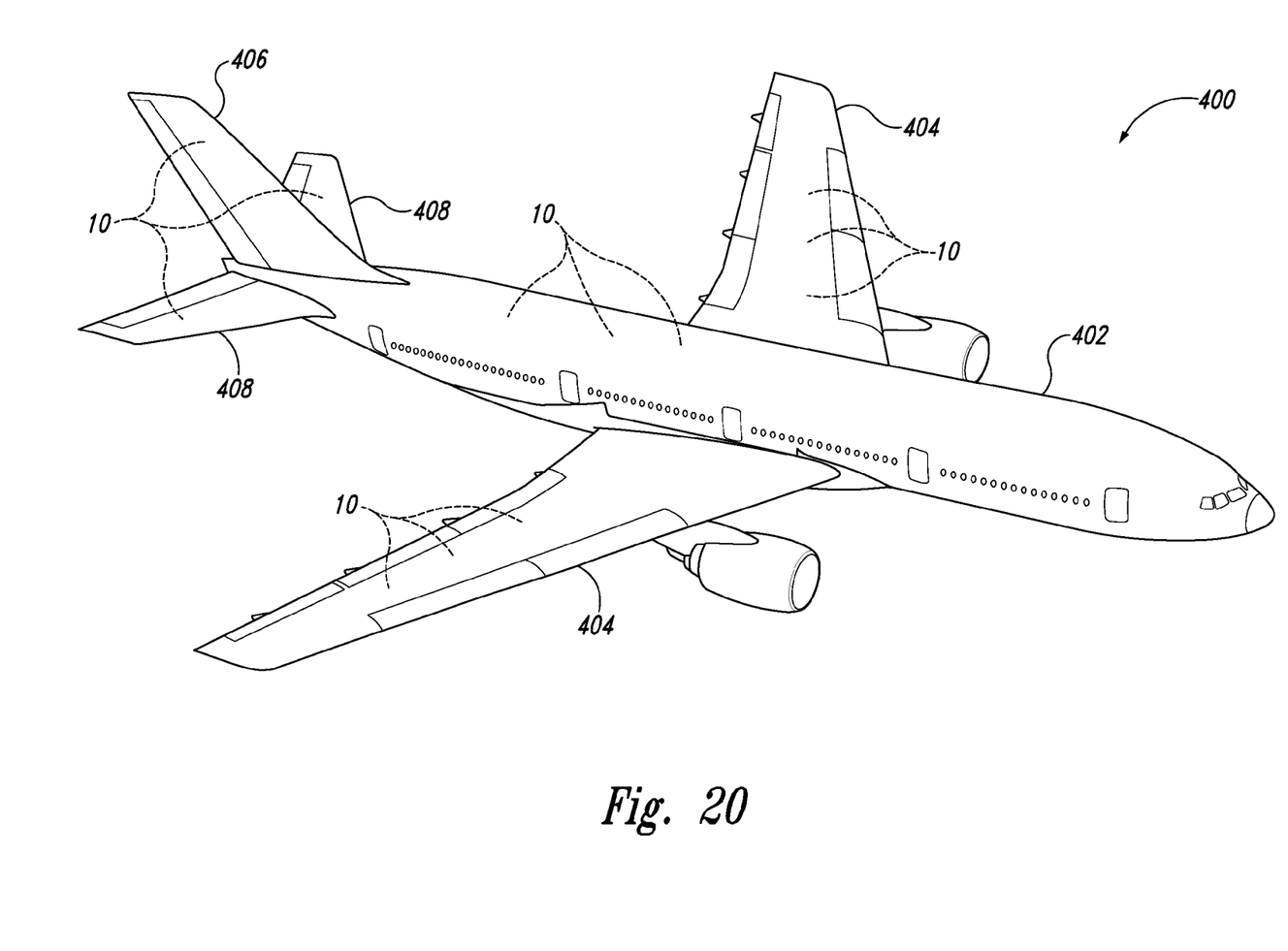
FIG. 20 is a perspective view of an illustrative, non-exclusive example of an aircraft.

Elongate weldments 10 that are manufactured by a method 100 according to the present disclosure may be utilized in any suitable application to construct any suitable apparatus, including (but not limited to) aerospace applications. For example, illustrative, non-exclusive examples of apparatuses that may incorporate one or more elongate weldments 10 include aircraft, spacecraft, watercraft, land vehicles, wind turbines, structural towers and masts, buildings, etc. FIG. 20 generically presents an aircraft 400, which may include one or more elongate weldments 10 manufactured according to a method 100. While FIG. 20 illustrates aircraft 400 in the form of a fixed wing commercial aircraft, other types of configurations of aircraft are within the scope of the present disclosure, including (but not limited to) military aircraft, private aircraft, and rotorcraft.

As schematically illustrated in FIG. 20, an aircraft 400 may include a fuselage 402, wings 404, a vertical stabilizer 406, and horizontal stabilizers 408, one or more of which may include one or more elongate weldments 10 constructed utilizing a method 100 according to the present disclosure, as schematically indicated in FIG. 20. As illustrative, non-exclusive examples, one or more elongate weldments 10 may define one or more of seat tracks, joints between two or more panels (e.g., fiber composite panels and/or honeycomb cores), ribs, spars, stringers, and frames.

Figure 21:
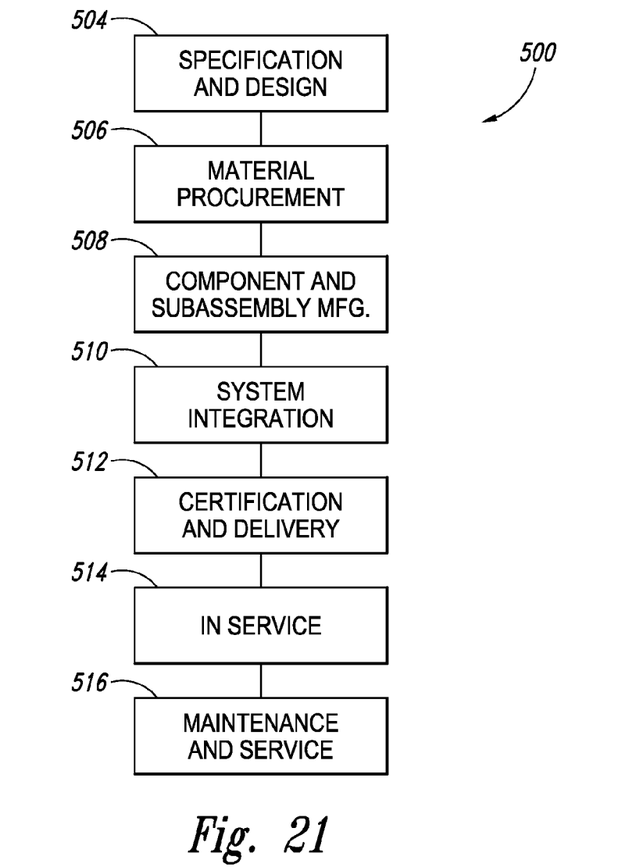
FIG. 21 is a flowchart representing aircraft production and service methodology.
Figure 22:
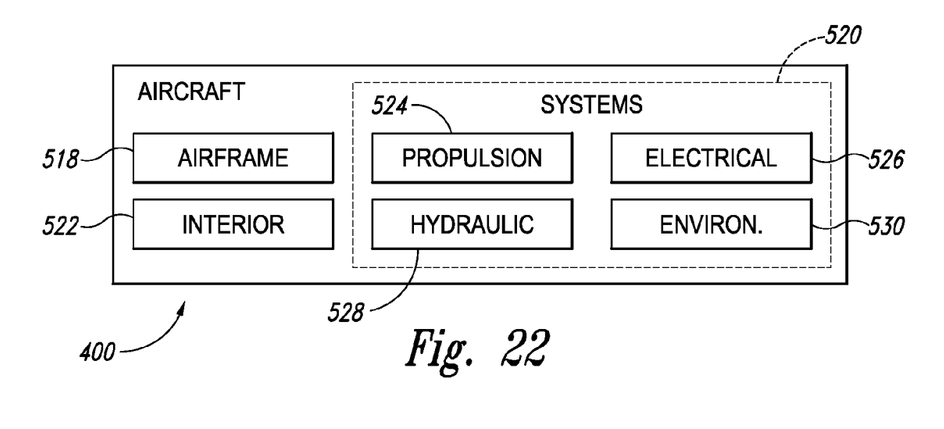
FIG. 22 is a schematic block diagram representing an aircraft.

Turning now to FIGS. 21-22, embodiments of the present disclosure may be described in the context of an aircraft manufacturing and service method 500 as shown in FIG. 21 and an aircraft 400 as shown in FIG. 22. During pre-production, exemplary method 500 may include specification and design 504 of the aircraft 400 and material procurement 506. During production, component and subassembly manufacturing 508 and system integration 510 of the aircraft 400 takes place. Thereafter, the aircraft 400 may go through certification and delivery 512 in order to be placed in service 514. While in service by a customer, the aircraft 514 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 400 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 500. For example, components or subassemblies corresponding to production process 508 may be fabricated or manufactured in a manner similar to components or subassemblies produced while the aircraft 400 is in service. Also, one or more apparatus embodiments, method embodiments, or a combination thereof may be utilized during the production stages 508 and 510, for example, by substantially expediting assembly of or reducing the cost of an aircraft 400. Similarly, one or more of apparatus embodiments, method embodiments, or a combination thereof may be utilized while the aircraft 400 is in service, for example and without limitation, to maintenance and service 516.

Illustrative, non-exclusive examples of inventive subject matter according to the present disclosure are described in the following enumerated paragraphs:

A. A method of manufacture, comprising:

welding two or more elongate members together to define an elongate weldment, wherein the welding results in a weld region that is in tension and regions adjacent to the weld region that are in compression; and longitudinally stretching the elongate weldment.

A1. The method of paragraph A, wherein the longitudinally stretching includes plastically deforming the weld region.

A2. The method of any of paragraphs A-A1, wherein the longitudinally stretching includes elastically, and optionally only elastically, deforming the regions adjacent to the weld region.

A3. The method of any of paragraphs A-A2, wherein the longitudinally stretching does not plastically deform at least a portion of, and optionally at least a substantial portion of, the regions adjacent to the weld region.

A4. The method of any of paragraphs A-A3, wherein the welding further results in regions distal from the weld region relative to the regions adjacent to the weld region that are neither in compression nor in tension.

A4.1. The method of paragraph A4, wherein the longitudinally stretching includes elastically, and optionally only elastically, deforming the regions distal from the weld region.

A4.2. The method of any of paragraphs A4-A4.1, wherein the longitudinally stretching does not plastically deform the regions distal from the weld region.

A5. The method of any of paragraphs A-A4.2, wherein the longitudinally stretching includes applying an applied tension to the elongate weldment, wherein the applied tension is greater than a plastic yield strength of the weld region.

A5.1. The method of paragraph A5, wherein the applied tension is less than a plastic yield strength of the two or more elongate members prior to the welding.

A5.2. The method of any of paragraphs A5-A5.1, wherein the welding results in regions distal from the weld region relative to the regions adjacent to the weld region that are neither in compression nor in tension, and wherein the applied tension is less than a plastic yield strength of the regions distal from the weld region.

A5.2.1. The method of paragraph A5.2, wherein the applied tension is greater than a plastic yield strength of the regions adjacent to the weld region.

A6. The method of any of paragraphs A-A5.2.1, wherein the longitudinally stretching results in the elongate weldment being, and optionally substantially being, neither in compression nor in tension.

A7. The method of any of paragraphs A-A6, wherein the longitudinal stretching results in the elongate weldment having, and optionally substantially having, a uniform yield strength across an entirety, and optionally substantially an entirety, of the elongate weldment.

A7.1. The method of paragraph A7, wherein the uniform yield strength is equal to, and optionally is substantially equal to, a yield strength of the elongate members prior to the welding.

A8. The method of any of paragraphs A-A7.1, wherein the welding further results in one or more of twisting, buckling, and/or bowing of the elongate weldment, and wherein the longitudinally stretching includes straightening the elongate weldment.

A9. The method of any of paragraphs A-A8, wherein the longitudinally stretching includes engaging end regions of the elongate weldment and pulling on the end regions in opposing directions.

A10. The method of any of paragraphs A-A8, further comprising:
supplying stock to define the two or more elongate members; and
cutting the elongate weldment to define a plurality of elongate weldments.

A10.1. The method of paragraph A10, wherein the longitudinally stretching includes longitudinally feeding the elongate weldment at two different rates at two spaced-apart positions along the elongate weldment.

A10.2. The method of any of paragraphs A10-A10.1, wherein the longitudinally stretching includes longitudinally pulling at two different pressures at two spaced-apart positions along the elongate weldment.

A11. The method of any of paragraphs A-A10.2, wherein the two or more elongate members are constructed of a metal, optionally of titanium, a titanium alloy, aluminum, an aluminum alloy, or a steel, or of a weldable plastic.

A12. The method of any of paragraphs A-A11, further comprising:
utilizing the elongate weldment in a desired application, optionally wherein the desired application is an aerospace application.

A12.1. The method of paragraph A12, wherein the utilizing is performed without first heat-treating the elongate weldment.

A13. An elongate weldment manufactured according to the method of any of paragraphs A-A12.1.

A14. An aircraft including one or more elongate members manufactured according to the method of any of paragraphs A-A12.1.

A15. The aircraft of paragraph A14, wherein the one or more elongate members define one or more of seat tracks, joints between two or more fiber composite panels, ribs, spars, stringers, frames, and joints with honeycomb cores.

B. A tool for manufacturing an elongate weldment, the tool comprising:
two spaced-apart grippers, wherein each gripper is configured to selectively and securely grip an end region of an elongate weldment defined by two or more flat sections; and
a mechanism configured to selectively move the two spaced-apart grippers away from each other to selectively stretch an elongate weldment that is held by and between the two spaced-apart grippers.

B1. The tool of paragraph B, wherein each gripper is configured to selectively and securely grip an end region of an elongate weldment defined by two or more flat sections that are angled relative to each other.

C. A system for manufacturing an elongate weldment, the system comprising:
a stock of two or more ribbons of material;
a welder positioned to operatively weld together the two or more ribbons to define an elongate weldment;
a stretcher positioned and configured to stretch the elongate weldment; and
a cutter positioned and configured to cut the elongate weldment into a plurality of elongate weldments after the elongate weldment has been stretched by the stretcher.

C1. The system of paragraph C, further comprising:
a feed mechanism configured to operatively feed the two or more ribbons from the stock, to the welder, to the stretcher, and to the cutter.

C1.1. The system of paragraph C1, wherein the feed mechanism includes and/or defines the stretcher, and/or wherein the stretcher includes and/or defines the feed mechanism.

C2. The system of any of paragraphs C-C1.1, wherein the stretcher includes an upstream conveyor and a downstream conveyor spaced-apart from the upstream conveyor, wherein the upstream conveyor and the downstream conveyor are configured to operatively grip the elongate weldment and pull the elongate weldment away from the welder.

C2.1. The system of paragraph C2, wherein the downstream conveyor is configured to operatively pull on the elongate weldment at a faster rate than the upstream conveyor so that a region of the elongate weldment between the upstream conveyor and the downstream conveyor is operatively stretched as it passes between the upstream conveyor and the downstream conveyor.

C2.2. The system of any of paragraphs C2-C2.1, wherein the downstream conveyor is configured to pull on the elongate weldment with a higher pressure than the upstream conveyor so that a region of the elongate weldment between the upstream conveyor and the downstream conveyor is operatively stretched as it passes between the upstream conveyor and the downstream conveyor.

C3. The system of any of paragraphs C-C1.1, wherein the stretcher includes a pair of upstream grippers and a pair of downstream grippers spaced-apart from the pair of upstream grippers, wherein the pair of upstream grippers are configured to alternately grip the elongate weldment and pull the elongate weldment away from the welder, wherein the pair of downstream grippers are configured to alternately grip the elongate weldment away from the welder so that the region of the elongate weldment between the pair of upstream grippers and the pair of downstream grippers is operatively stretched as it passes between the pair of upstream grippers and the pair of downstream grippers.

C3.1. The system of paragraph C3, wherein the pair of downstream grippers are configured to pull on the elongate weldment at a faster rate than the pair of upstream grippers.

C3.2. The system of any of paragraphs C3-C3.1, wherein the pair of downstream grippers is configured to pull on the elongate weldment with a higher pressure than the pair of upstream grippers.

C4. The system of any of paragraphs C-C3.2, wherein the stretcher is operatively configured to stretch the elongate weldment so that a weld region of the elongate weldment is plastically deformed.

C5. The system of any of paragraphs C-C4, wherein the stretcher is operatively configured to stretch the elongate weldment so that regions of the elongate weldment that are adjacent to the weld region are elastically deformed, and optionally only elastically deformed.

C6. The system of any of paragraphs C-C5, wherein the stretcher is operatively configured to stretch the elongate weldment so that at least a portion of, and optionally at least a substantial portion of, regions of the elongate weldment that are adjacent to the weld region are not plastically deformed.

C7. The system of any of paragraphs C-C6, wherein the stretcher is configured to operatively apply tension to the elongate weldment that is greater than the plastic yield strength of a weld region of the elongate weldment.

C7.1. The system of paragraph C7, wherein the stretcher is configured to operatively apply tension to the elongate weldment that is less than the plastic yield strength of the two or more ribbons of material prior to being welded.

C7.2. The system of any of paragraphs C7-C7.1, wherein the stretcher is configured to operatively apply tension to the elongate weldment that is less than the plastic yield strength of regions of the elongate weldment that are adjacent to a weld region of the elongate weldment.

C8. The system of any of paragraphs C-C7.2, wherein the stretcher is operatively configured to longitudinally stretch the elongate weldment so that following being stretched, the elongate weldment is neither in compression nor in tension.

C9. The system of any of paragraphs C-C8, wherein the stretcher is operatively configured to longitudinally stretch the elongate weldment so that following being stretched, the plurality of the elongate weldments have, and optionally substantially have, a uniform yield strength across an entirety, and optionally substantially an entirety, of the plurality of elongate weldments.

C9.1. The system of paragraph C9, wherein the uniform yield strength is equal to, and optionally is substantially equal to, the yield strength of the stock of two or more metal ribbons.

C10. The system of any of paragraphs C-C9.1, wherein the two or more ribbons of material are constructed of metal, optionally of titanium, titanium alloy, aluminum, aluminum alloy, or steel, or of a weldable plastic.

C11. The system of any of paragraphs C-C10, wherein the system is configured to perform the method of any of paragraphs A-A11.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for manufacturing an elongate weldment and configured to perform a method of manufacture, comprising:
    welding two or more elongate members together to define the elongate weldment, wherein the welding results in a weld region that is in tension and regions adjacent to the weld region that are in compression; and
    longitudinally stretching the elongate weldment, wherein the longitudinally stretching includes applying an applied tension to the elongate weldment, wherein the applied tension is greater than a plastic yield strength of the weld region, and wherein the applied tension is less than a plastic yield strength of the two or more elongate members prior to the welding;
    the system comprising:
    a stock of two or more ribbons of material, wherein the two or more ribbons of material define the two or more elongate members;
    a welder positioned to operatively weld together the two or more ribbons of material to define the elongate weldment, wherein the welder is configured to perform the welding;
    a stretcher positioned and configured to apply an applied tension to the elongate weldment and perform the longitudinally stretching; and
    a cutter positioned and configured to cut the elongate weldment into a plurality of elongate weldments after the elongate weldment has been stretched by the stretcher.

2. A system for manufacturing an elongate weldment, the system comprising:
    a stock of two or more ribbons of material;
    a welder positioned to operatively weld together the two or more ribbons of material to define the elongate weldment;
    a stretcher positioned and configured to apply an applied tension to the elongate weldment; and a cutter positioned and configured to cut the elongate weldment into a plurality of elongate weldments after the applied tension has been applied to the elongate weldment by the stretcher.

3. The system of claim 2, further comprising:
a feed mechanism configured to operatively feed the two or more ribbons of material from the stock, to the welder, to the stretcher, and to the cutter.

4. The system of claim 3, wherein the feed mechanism includes the stretcher.

5. The system of claim 2, wherein the stretcher includes an upstream conveyor and a downstream conveyor spaced-apart from the upstream conveyor, wherein the upstream conveyor and the downstream conveyor are configured to operatively grip the elongate weldment and pull the elongate weldment away from the welder.

6. The system of claim 5, wherein the downstream conveyor is configured to operatively pull on the elongate weldment at a faster rate than the upstream conveyor so that a region of the elongate weldment between the upstream conveyor and the downstream conveyor is operatively stretched as it passes between the upstream conveyor and the downstream conveyor.

7. The system of claim 5, wherein the downstream conveyor is configured to pull on the elongate weldment with a higher pressure than the upstream conveyor so that a region of the elongate weldment between the upstream conveyor and the downstream conveyor is operatively stretched as it passes between the upstream conveyor and the downstream conveyor.

8. The system of claim 2, wherein the stretcher includes a pair of upstream grippers and a pair of downstream grippers spaced-apart from the pair of upstream grippers, wherein the pair of upstream grippers are configured to alternately grip the elongate weldment and pull the elongate weldment away from the welder, wherein the pair of downstream grippers are configured to alternately grip the elongate weldment and pull the elongate weldment away from the welder so that a region of the elongate weldment between the pair of upstream grippers and the pair of downstream grippers is operatively stretched as it passes between the pair of upstream grippers and the pair of downstream grippers.

9. The system of claim 8, wherein the pair of downstream grippers are configured to pull on the elongate weldment at a faster rate than the pair of upstream grippers.

10. The system of claim 8, wherein the pair of downstream grippers are configured to pull on the elongate weldment with a higher pressure than the pair of upstream grippers.

11. The system of claim 2, wherein the stretcher is operatively configured to stretch the elongate weldment so that a weld region of the elongate weldment is plastically deformed.

12. The system of claim 2, wherein the stretcher is operatively configured to stretch the elongate weldment so that regions of the elongate weldment that are adjacent to the weld region are only elastically deformed.

13. The system of claim 2, wherein the stretcher is operatively configured to stretch the elongate weldment so that at least a substantial portion of regions of the elongate weldment that are adjacent to the weld region are not plastically deformed.

14. The system of claim 2, wherein the stretcher is configured to operatively apply tension to the elongate weldment that is greater than the plastic yield strength of a weld region of the elongate weldment.

15. The system of claim 14, wherein the stretcher is configured to operatively apply tension to the elongate weldment that is less than the plastic yield strength of the two or more ribbons of material prior to being welded.

16. The system of claim 14, wherein the stretcher is configured to operatively apply tension to the elongate weldment that is less than the plastic yield strength of regions of the elongate weldment that are adjacent to the weld region of the elongate weldment.

17. The system of claim 2, wherein the stretcher is operatively configured to longitudinally stretch the elongate weldment so that following being stretched, the elongate weldment is neither in compression nor in tension.

18. The system of claim 2, wherein the stretcher is operatively configured to longitudinally stretch the elongate weldment so that following being stretched, the plurality of elongate weldments substantially have a uniform yield strength across substantially an entirety of the plurality of elongate weldments.

19. The system of claim 18, wherein the uniform yield strength is substantially equal to the yield strength of the stock of two or more ribbons of material.

20. The system of claim 2, wherein the two or more ribbons of material are constructed of titanium.

* * * * *